United States Patent [19]

de Crepy

[11] 3,997,726

[45] Dec. 14, 1976

[54] COIN TELEPHONE SET

[75] Inventor: Edouard de Crepy, Paris, France

[73] Assignee: Societe Anonyme Francaise des Appareils Automatiques, Taximeteres-Taxiphones "SAFAA", Paris, France

[22] Filed: May 19, 1975

[21] Appl. No.: 578,748

[30] Foreign Application Priority Data

May 24, 1974 France .............................. 74.18095

[52] U.S. Cl. .............................. 179/6.3 R; 179/6.4
[51] Int. Cl.$^2$ ........................................ H04M 17/02
[58] Field of Search ................ 179/6.3 R, 6.31, 7 R

[56] References Cited

UNITED STATES PATENTS

| | | | |
|---|---|---|---|
| 3,221,101 | 11/1965 | Clark, Jr. .......................... | 179/6.31 |
| 3,579,253 | 5/1971 | Edington et al. ............... | 179/6.3 R |
| 3,814,907 | 6/1974 | Edington et al. ............... | 179/6.3 R |
| 3,881,062 | 4/1975 | Beeman .......................... | 179/6.3 R |

FOREIGN PATENTS OR APPLICATIONS

| | | | |
|---|---|---|---|
| 736,048 | 6/1966 | Canada .............................. | 179/6.31 |
| 1,055,734 | 1/1967 | United Kingdom ............ | 179/6.3 R |

*Primary Examiner*—Kathleen H. Claffy
*Assistant Examiner*—Gerald L. Brigance

[57] ABSTRACT

Coin telephone set comprising a telephone station adapted to be connected to two wires of a telephone line from a telephone exchange, a call charge signal detecting circuit connected in parallel to the telephone station, an assembly of control and monitoring switching means operable by coins, respectively, logic circuits for processing the output signal from said call charge signal detecting and the output signals from the assembly of control and monitoring switching means, and a computing unit interconnected with the logic circuits for keeping up to date the account of the user of the telephone set from the moment the latter is connected to the desired telephone subscriber. The computing unit comprises a series of D-type flip-flops having each a clock input, a signal input, a resetting input, a setting input and an output, and a series of elementary adders equal in number to aid D-type flip-flops. Each adder is associated with a respective one of the D-type flip-flop having the same order number in the series, and has a first input connected to the output of the associated D-type flip-flop of the series, a second input for receiving from the logic circuits a respective one of the bits of a code $q$ of an information $p$ ($p$ being a positive, negative or zero integer representing an amount of money to be carried to the credit or debit of the user's account). The respective one bit has a weight $i$ ($i = 1, 2. \ldots n+1$) equal to the order number of the considered elementary adder, and said code $q$ is defined as follows:

$q = C_p$ when $p \geq 0$
$q = C_a - C_p$ when $p < 0$ wherein $n$ is a minimum integer such that:

$$2^n - 1 \geq p \geq -2^n$$

and wherein $C_a$ and $C_p$ are the pure binary coded expressions of $2^{n+2}$ and of the absolute value of the information $p$ on ($n + 1$) digits. Each elementary adder further comprises a carry input for receiving a carry output signal from the next preceding elementary adder in the series, a carry output connected to the carry input of the next succeeding elementary adder in the series, and an output connected to the signal input of the associated D-type flip-flop for applying thereto a signal representing the sum of the signals applied to the first, second and carry inputs of the considered elementary adder.

12 Claims, 7 Drawing Figures

COIN TELEPHONE SET

BACKGROUND OF THE INVENTION

1. Field of the invention

The present invention relates to a coin telephone set, of the type comprising a telephone station adapted to be connected to two wires of a telephone line from a telephone exchange, a cable charge signal detecting circuit connected in parallel to the telephone station, an assembly of control and monitoring switching means, and a computing unit interconnected with said logic circuits for keeping up to date the account of the user of the telephone set from the moment the latter is connected to the desired telephone subscriber.

2. Description of the prior art

Telephone sets of the type broadly mentioned hereinabove are already known wherein the computer unit consists of an up-down counter. However, this arrangement is attended by a number of inconveniences as far as the treatment of information, the initialization and finally the changes in tariffs are concerned.

SUMMARY OF THE INVENTION

It is therefore the essential object of the present invention to provide a coin telephone set of the above-mentioned type which is free of the inconveniences encountered in the use of an up-down counter as a computer unit.

It is another object of this invention to provide a coin telephone set utilizing a computer unit adapted to be easily initiallized so as to debit or charge the user's account with the value of a first call charge which may differ from the values of the following call charges to be paid by the user of the telephone set for continuing his conversation with the connected subscriber.

To this end, the invention provides a coin telephone set of the type broadly set forth above, wherein the computing unit comprises a series of D-type flip-flops having each a clock input, a signal input, a resetting input, a setting input and an output, and a series of elementary adders equal in number to the number of D-type flip-flops. Each adder is associated with a respective one of the D-type flip-flops having the order number in the series, and has a first input connected to the output of the associated D-type flip-flops of the series, a second input for receiving from the logic circuits a respective one of the bits of a code $q$ of an information $p$ ($p$ being a positive, negative or zero representing an amount of money to be carried to the credit or debit of the user's account). The respective one bit has a weight $i$ ($i = 1, 2, \ldots n+1$) equal to the order number of the considered elementary adder, and said code $q$ is defined as follows:

$q = C_p$ when $p \geq 0$
$q = C_n - C_p$ when $p < 0$ wherein $n$ is a minimum integer such that:

$$2^n - 1 \geq p \geq -2^n$$

and wherein $C_n$ and $C_p$ are pure binary coded expressions of $2^{n+2}$ and of the absolute value of the information $p$ on $(n + 1)$ digits. Each elementary adder further comprises a carry input for receiving a carry output signal from the next preceding elementary adder, in the series, a carry output connected to the carry input of the next succeeding elementary adder in the series, and an output connected to the signal input of the associated D-type flip-flop for applying thereto a signal representing the sum of the signals applied to the first, second and carry inputs of the considered elementary adder.

BRIEF DESCRIPTION OF THE DRAWINGS

These objects and other objects, features and advantages of this invention will appear more clearly as the following detailed description proceeds with reference to the attached drawings, in which.

DESCRIPTION OF THE PREFERRED EMBODIMENT

Figure 1:
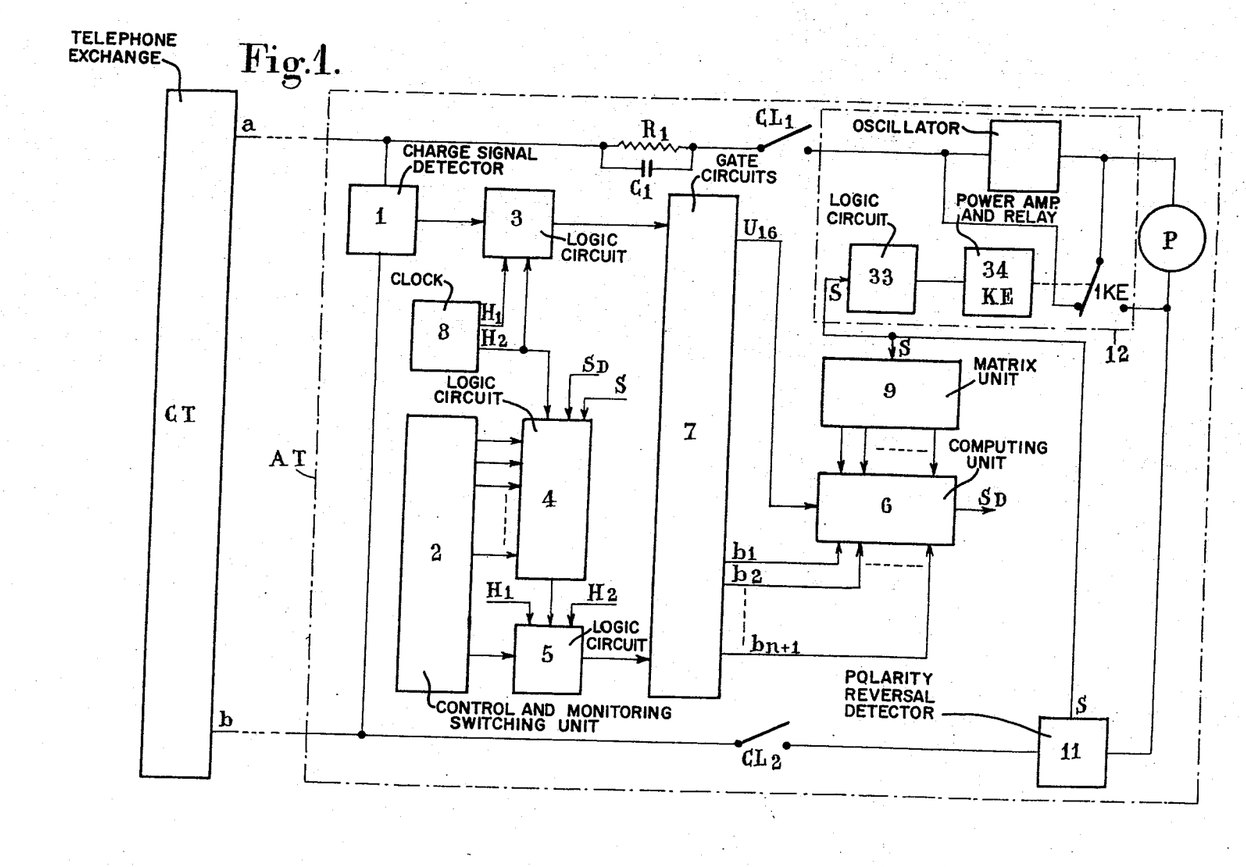
FIG. 1 is a block diagram illustrating a coin telephone set embodying the invention.

The coin telephone set AT illustrated in FIG. 1 comprises in a manner known per se a telephone station P adapted to be connected, through line contacts $CL_1$ and $CL_2$ and also through a line adjusting circuit comprising for example a resistor $R_1$ and a capacitor $C_1$ in parallel with said resistor, to the pair of wires $a$ and $b$ of a telephone line connected in turn to a telephone exchange CT. This telephone exchange CT is known per se and comprises the control and monitoring circuits necessary for interconnecting various telephone sets, such as the coin telephone set AT according to this invention and the telephone set of the telephone subscriber called by the user of the coin telephone set AT. The telephone exchange CT further comprises known means for reversing the polarities of the telephone wires $a$ and $b$ of the line when said telephone exchange has found the subscriber called by the user of the telephone set AT and has consequently interconnected the two telephone sets. Finally, said telephone exchange CT further comprises devices known per se for delivering call charge pulses to the telephone line $a$, $b$, for example in the case of an intercity call.

The telephone set AT illustrated in FIG. 1 further comprises in a manner known per se a call charge signal detecting circuit 1 connected to the pair of wires $a$ and $b$ of the telephone line; an assembly 2 of control and monitoring switching means adapted to be actuated by coins, respectively; logic circuits 3, 4 and 5 for processing the output signal from the call charge signal detecting circuit 1 and the output signals from said assembly 2 of control and monitoring switching means; and a computing unit 6 for keeping up to date the account of the user of said coin telephone set AT from the moment said user is connected to the called telephone subscriber. The reference numeral 7 designates an assembly of gate circuits interconnecting said logic circuits 3, 5 and said computing unit 6. The reference numeral 8 designates a clock delivering two clock pulse signals $H_1$ and $H_2$. The pulses of these two clock signals have the same frequency but are somewhat off-set in time so that the pulses from one of the two clock signals alternate with those of the other clock signal. As will be explained presently, these two clock pulse signals are used for synchronizing the operation of logic circuits 3, 4 and 5 and also of said computing unit 6. of According to a typical feature characterizing the present invention a matrix unit 9 adapted to code the value of the first sum to be charged is associated with the computing unit 6 in a manner to be described in detail presently. The operation of this matrix unit is controlled through a circuit 11 adapted to detect a possible reversal of the polarities of wires $a$ and $b$ of the telephone line. The output signal S of this detecting circuit 11 is also adapted to control a warning circuit 12 and likewise the logic circuit 4 simultaneously with a debit signal $S_D$ delivered by the computing unit 6.

The above-mentioned circuits will now be described more in detail with reference to FIGS. 2 to 7 inclusive of the drawings.

Figure 2:
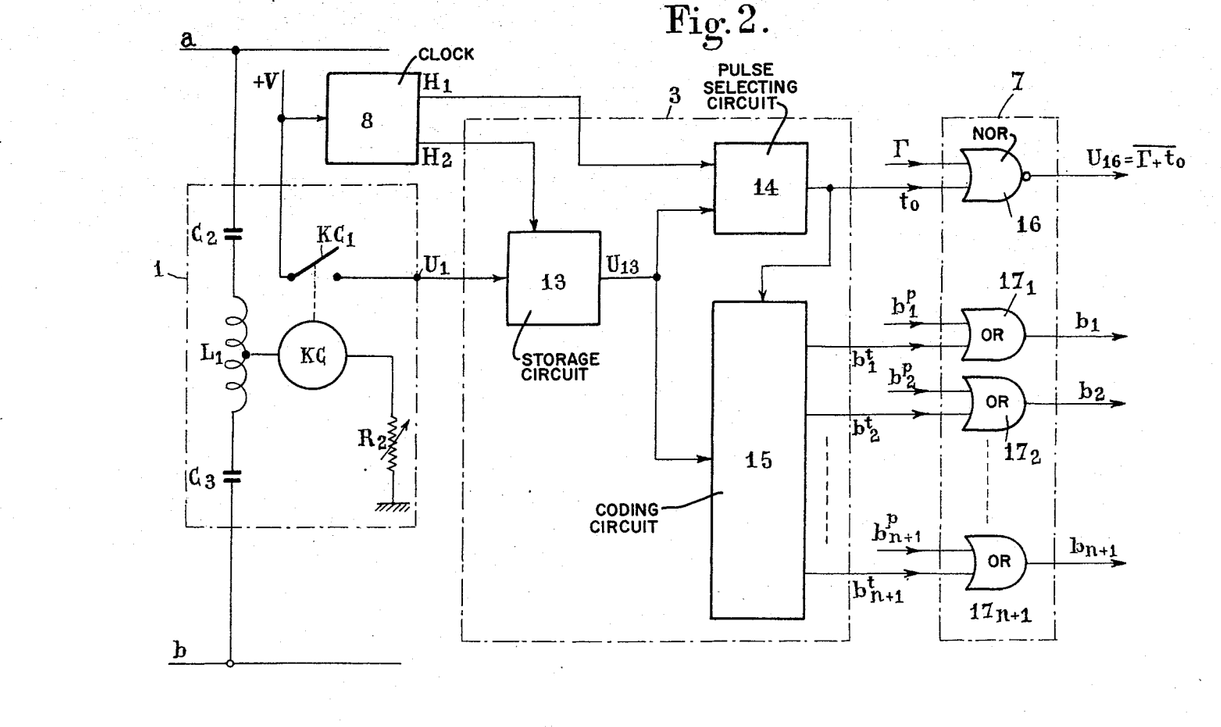
FIG. 2 is a more detailed block diagram showing a call charge signal detecting circuit and a logic circuit for processing said call charge signals, which are both incorporated in the coin telephone set illustrated in FIG. 1.
Figure 3:
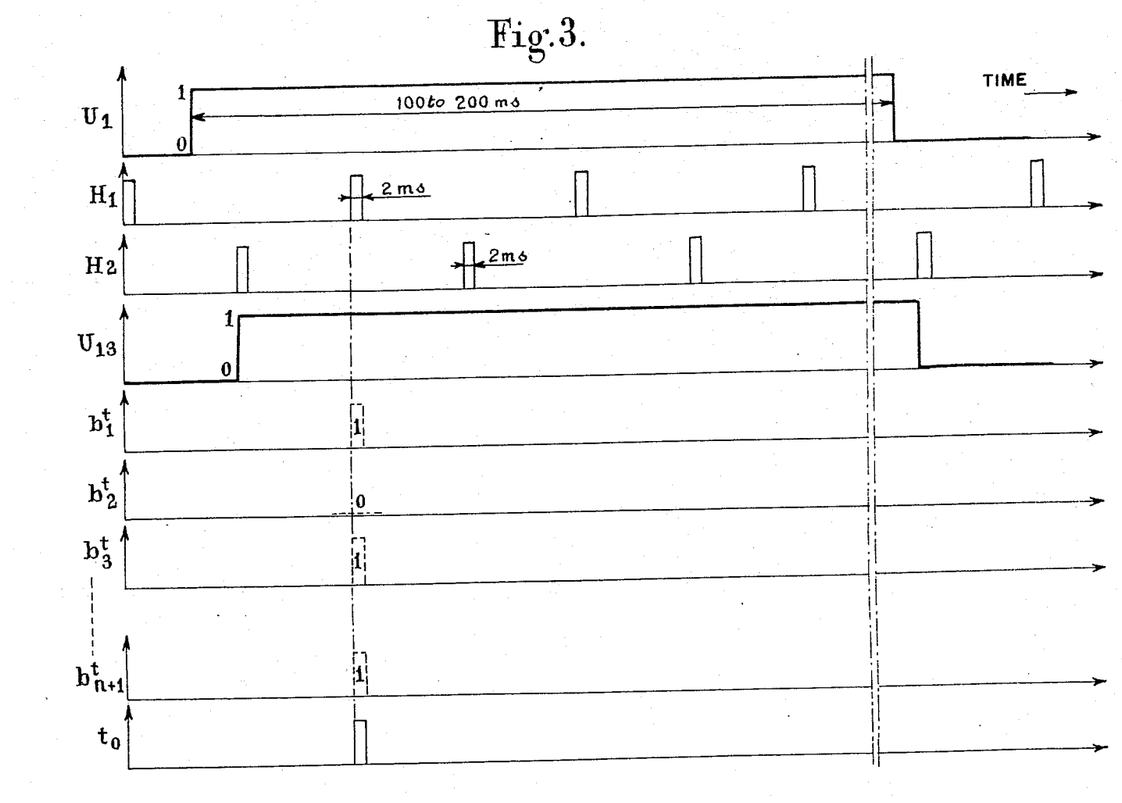
FIG. 3 is a diagram showing wave forms useful for explaining the mode of operation of the circuits of FIG. 2.

Reference will firstly be made to FIG. 2 illustrating a typical embodiment of the circuit means 1 for detecting the first call charge signal, of the logic circuit 3 for processing this call charge signal, and of the gate circuit 7. The detecting circuit 1 is designed for detecting the call charge pulse emitted from the telephone exchange (tuned circuit $C_2 | C_3 |$ coil of relay KC), which causes the relay coil KC to be energized and consequently to close its contact $KC_1$. Thus, a signal $U_1$ having a waveform illustrated in FIG. 3 is obtained at the output of the detecting circuit 1 also designated by reference numeral $U_1$. The level "0" corresponds substantially to the ground potential (in the present disclosure the term "ground" designates the reference point Ov of the d.c. supply), and the level "1" corresponds to potential + V. The signal $U_1$ from the call charge signal detecting circuit 1 is fed to logic circuit 3 in which it is firstly memorized in a storage device 13 synchronized by a clock signal $H_2$ from clock 8. The waveform of this clock signal $H_2$ is illustrated in FIG. 3. The storage device 13, which may be of any suitable and known type, delivers at its output a signal $U_{13}$ of which the waveform is also shown in FIG. 3. This signal $U_{13}$ begins with the first pulse of clock signal $H_2$ following the beginning of said signal $U_1$ and ends simultaneously with the pulse of the clock signal $H_2$ following immediately the end of signal $U_1$.

The signal $U_{13}$ from storage device 13 is fed on the one hand to a pulse selecting circuit 14 and on the other hand to a coding circuit 15. The pulse selecting circuit 14, which may be of any type known to those skilled in the art and receives on another input the clock pulse signal $H_1$, is adapted to select and deliver at its output the first pulse of the clock pulse signal $H_1$ following the beginning of said signal $U_{13}$. The waveform of the output signal of the pulse selecting circuit 14 is illustrated at $t_0$ in FIG. 3. This signal $t_0$ is fed on the one hand to one of the two inputs of a NOR gate 16 receiving at its other input a signal $\Gamma$, and on the other hand to a general unlocking input of coding circuit 15. The output signal $U_{16}$ of NOR gate 16 is delivered to the computer unit 6 in order to control an addition operation in said computing unit 6 as will be explained presently.

The coding circuit 15 is of a type well known in the art and therefore its detailed description is not deemed necessary. Only the specific code known per se which is utilized in coding circuit 15 will be mentioned herein. Since the computing unit 6 must perform addition and substraction operations for keeping up to date the account of the user of the telephone set, the code chosen therefor is such that these two operations can be reduced to a single type of operation, whereby the construction of the computing unit is simplified considerably while affording a greater flexibility of use of the computing unit. This code, which is well known in the field of computers, has already been explained in the foregoing.

When a $t_0$ pulse appears, the coding circuit 15 delivers in synchronism therewith, on its outputs $b_1 \ldots b_{n+1}{}^t$, signals of which the presence at any output of given order $i$ ($i = 1 \ldots n+1$) corresponds to the logic state 1 or 0 of the digit of corresponding weight $i$ of the code $q$ subordinate to the preset call charge value for pulse $t_0$. Thus, for example, in FIG. 3 the signal $t_0$ corresponds to code $-3$. These signals $b_1{}^t, \ldots b_{n+1}{}^t$ are fed each to a first input of a respective OR gate $17_1$, $17_2$, $\ldots 17_{n+1}$ in the gate circuit 7 receiving at its other input a signal $b_1{}^p$, $b_2{}^p$, $\ldots b_{n+1}{}^p$ to be described presently, respectively. The output signals $b_1$, $b_2 \ldots b_{2+1}$ of the $(n+1)$OR gates $17_1$, $17_2$, $\ldots 17_{n+1}$ are fed to the computing unit 6 so as to add the same to the contents of the memory elements of this computing unit when the latter receives also the signal $U_{16}$ from the NOR gate 16 as it will be described hereinunder.

Figure 4:
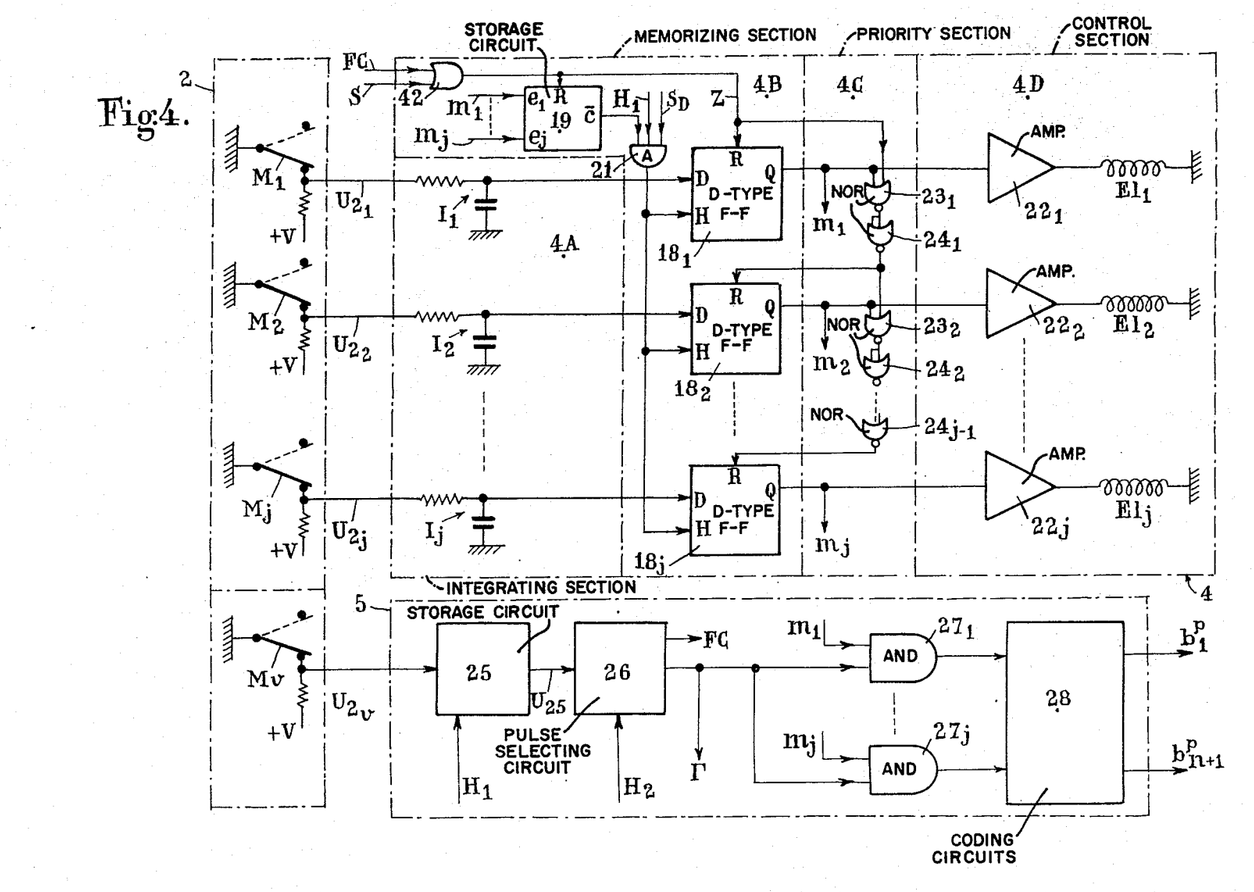
FIG. 4 is a more detailed block diagram showing an assembly of control and monitoring switching means, a coin collecting control logic circuit and a logic circuit for processing a control signal and the output signals of the coin collecting control logic circuit.

Now the assembly of switching means 2 and the logic circuits 4 and 5 will be described with reference to FIG. 4, in which it will be seen that the assembly 2 comprises a number of microswitches $M_1$, $M_2$, $\ldots M_j$. The microswitches are disposed in the coin sequestering means (not shown) of the coin telephone set so that they can be actuated by the coins introduced into the set. The number of such microswitches is such as to permit the detection of the payment of the first call charge by the user (for all the possible combinations of coins introduced into the coin sequestering means) and the detection of the presence of each type of coin in said coin sequestering means. When inoperative, each microswitch is in the position illustrated in thick lines in FIG. 4 and delivers a logic signal "0". When actuated by a coin, it is shifted to the position shown in dash lines in the same FIG. 4 and delivers a logic signal "1". Although other switching means could be used for the present invention purposes, the use of microswitches is advantageous in comparison with other known switching means (such as photoelectric means, for instance) in that it reduces considerably the power necessary for detecting the presence of coins. Thus the information derived from the contacts of these microswitches can be treated through logic means (not shown in FIG. 4) requiring but a very moderate power consumption, constantly supplied with a voltage available in the set and operative to close the telephone line only when the user has introduced enough money to cover the first call charge.

The signals outputs $U_{2_1}, \ldots U_{2_j}$ of the assembly of switching means 2 are fed to the logic circuit 4 operative to control the collection of coins from the coin sequestering means. Logic circuit 4 comprises an integrating section 4A, a memorizing section 4B, a coin collecting priority section 4C and a coin collecting control section 4D. In the integrating section 4A the signals from outputs $U_{2_1}, \ldots U_{2_j}$ pass through conventional integrating circuits $I_1, \ldots I_j$, respectively, and are subsequently fed to the inputs D of D-type flip-flop $18_1, 18_2, \ldots 18_j$, respectively. All the clock inputs H of flip-flops $18_1, \ldots 18_j$ are connected to the output of an AND gate 21 receiving at its three inputs the clock signal $H_1$, the debit signal $S_D$ (delivered, as will be explained presently, by the computer unit 6) and the complemented output signal $\bar{c}$ from a storage device 19 which may be of a type well known in the art, respectively. The complemented output $\bar{c}$ of storage device 19 goes low (from "1" to "0") when a "1" signal is fed to one of its $j$ inputs $e_1, \ldots e_j$, each input receiving the signals $m_1, \ldots m_j$ from the outputs Q of flip-flops $18_1, \ldots 18_j$, and goes high or remains high (logic state "1") on the occurence of the trailing edge of the signal fed to its resetting input R. Input R of storage device 19 receives the output signal from an OR gate 42 having two inputs to which are fed a signal FC from circuit 26 and a signal S generated in the detecting circuit 11 (FIGS. 1 and 6) to be described presently, respectively. Signal S has a value "1" after the combined set or hand microphone of the telephone station has been lifted but before the telephone communication has been established, and a value "0" when the desired connection is completed.

The output of AND gate 21 is such that if the debit signal $S_D$ fed to its second input assumes the logic state "1", and if, in addition, one of the memories $18_1, \ldots 18_j$ or 25 is not in state "1", and if, in addition, one of the memories $18_1, \ldots 18_j$ or 25 is not in state "1", the first pulse $H_1$ following the beginning of the debit signal $S_D$ is fed to all the inputs H of flip-flops $18_1, \ldots 18_j$.

The outputs Q of flip-flops $18_1, \ldots 18_j$ are connected to power amplifiers $22_1, 22_2, \ldots 22_j$, respectively, of section 4D controlling the collection of the coins. Each of these amplifiers, when an output signal from the associated flip-flop $18_1, 18_2 \ldots$ or $18_j$ is fed thereto, causes the associated electromagnet $EL_1, \ldots$ or $EL_j$ to be energized, thereby causing a predetermined coin type to be collected, for example by releasing a barrier or trap to enable the coin to drop or slide by gravity into a cash-box of the telephone set.

Since the coins cannot be collected simultaneously, but in a predetermined order, for example according to the increasing values thereof, a section 4C determining the priority order of such collection is provided for controlling the memories $18_1, \ldots 18_j$ in such a manner that the power amplifiers $22_1, \ldots 22_j$ cause the coins to be collected in a predetermined order (for example by beginning with the smallest values). This section 4C may be of the type illustrated in FIG. 4, the logic being such that a memory $18_i$ of order $i$ ($i = 1, 2 \ldots j$) when in the aforesaid state "1", clears or resets the memories having an order number higher than $i$. Under these circumstances, the coin having the smallest value controls the memory $m_1$ and the coin having the highest value controls the memory $m_j$.

Figure 5:
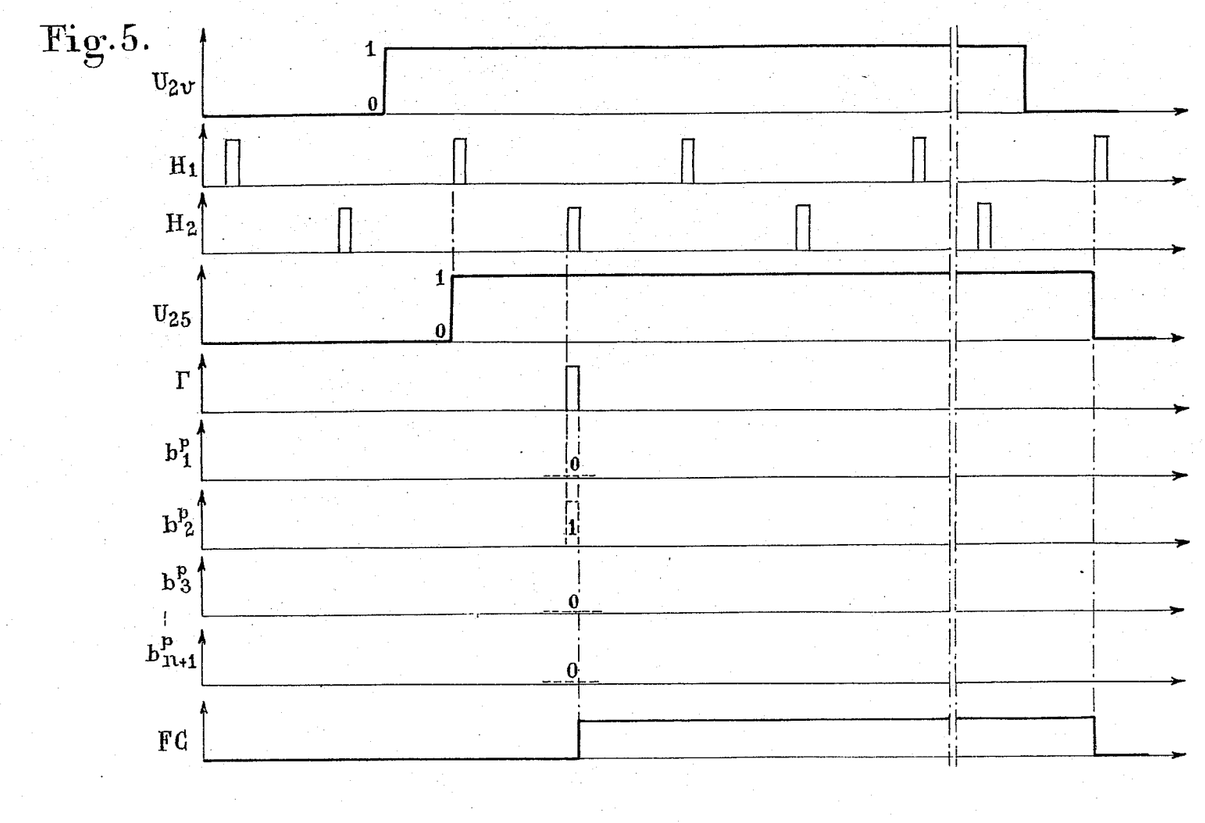
FIG. 5 illustrates signal waveforms useful for explaining the mode of operation of the circuits shown in FIG. 4.

Each coin, during its collection, follows at the end of its travel a path common to all the coins before falling into the cash-box of the telephone set. Travelling along this common path the coin actuates a monitoring microswitch $M_r$ provided in the microswitch assembly 2 for producing an enabling signal. The enabling signal waveform thus obtained is illustrated in FIG. 5 and designated by the reference symbol $U_{2v}$. Enabling signal $U_{2v}$ is subsequently fed to the logic circuit 5 in which it is firstly memorized in a storage device 25 synchronized with the clock pulse signal $H_1$. Storage device 25 is similar to storage device 13 of logic circuit 3 illustrated in FIG. 2. Thus, the signal $U_{25}$ generated at the output of storage device 25 with the waveform shown in FIG. 5 begins simultaneously with the first clock signal pulse $H_1$ following the beginning or front edge of signal $U_{2v}$, and ends simultaneously with the clock pulse signal $H_1$ following immediately the end or trailing edge of said signal $U_{2v}$. Signal $U_{25}$ is then fed to a pulse selecting circuit 26 having a first section for generating the output signal $\Gamma$, which is similar to the pulse selecting circuit 14. This first section of circuit 26 is adapted to produce at its output only the first pulse of the clock pulse signal $H_2$ following the beginning of signal $U_{25}$. The waveform of this first pulse $\Gamma$ is illustrated in FIG. 5. Circuit 25 has also a second section for generating an output signal FC which goes high (logic "1") on the occurrence of the trailing edge of pulse $\Gamma$ and which goes low (logic "0") on the occurrence of the trailing edge of signal $U_{25}$. The waveform of signal FC is also illustrated in FIG. 5.

The signal FC is fed to the first input of OR gate 42. Pulse $\Gamma$ is fed on the one hand to the second input of NOR gate 16 (FIG. 2) in gate circuit 7 and on the other hand, in parallel, to the first inputs of a series of AND gates $27_1, \ldots 27_j$. The second inputs of these gates $27_1, \ldots 27_j$ receive the signals $m_1, \ldots m_j$ respectively, which appear on the outputs Q of flip-flops $18_1, \ldots 18_j$. The outputs of AND gates $27_1, \ldots 27_j$ are connected to the relevant inputs of a coding circuit 28. Like the coding circuit 15 illustrated in FIG. 2, coding circuit 28 is arranged to deliver at its outputs a coded signal consistent with the code described in the foregoing in connection with the coding circuit 15; therefore, it is not deemed necessary to repeat this detailed description.

When a pulse signal $\Gamma$ appears and throughout the duration of this pulse, each output $b_i^p$ ($i = 1, \ldots n+1$) of coding circuit 28 is in state "1" if the digit of the corresponding code for the coin being collected must be "1".

For instance, in FIG. 5, the signal generated at the outputs $b_i^p$ corresponds to a credit of 2 units (digit $b_1^p$ has the lowest weight). The outputs $b_i^p$ of coding circuit 28 are coupled to the relevent inputs of OR gates $17_1, \ldots 17_{n+1}$ of gate circuit 7, so that they can be treated by the computing unit 6.

At the end of pulse $\Gamma$, the signal FC resets the memories $18i$ ($i = 1 \ldots j$).

Now the circuit 11 for detecting a reversal of polarity of the wires a and b of the telephone line will be described with reference to FIG. 6. The output signals of this detecting circuit are coupled inter alia to logic circuit 4 as already explained hereinabove. This detecting circuit 11 comprises four diodes $D_1, D_2, D_3$ and $D_4$ forming a bridge, a supply unit 29, four resistors $R_3$ to $R_6$, two transistors $T_1$ and $T_2$, two amplifiers 31 and 32, and a pair of bistable elements KA and KB consisting for example of bistable relays having two reversing contacts, for instance.

Now the mode of operation of the above-mentioned detector circuit 11 will be described. Assuming that the user has taken up the hand microphone of the telephone station P (thereby closing contacts $CL_1$ and $CL_2$) and obtained the tone through telephone station P, diodes $D_2$ and $D_3$, supply unit 29 and resistor $R_3$, the wire $a$ of the telephone line is at a potential higher than that of wire $b$. Under these conditions, transistor $T_1$ is conducting and causes bistable element KA to switch its contacts 1KA and 2KA to the positions shown in dash lines in FIG. 6 in order to short-circuit resistor $R_3$. When the telephone exchange (not shown) has connected the coin telephone set to the selected subscriber, the polarities of wires $a$ and $b$ of the telephone line are reversed. As in the case of KA, the bistable element KB switches its contacts 1KB and 2KB, thereby short-circuiting resistor $R_4$. At this time, no resistor element is left in series in the telephone line. Transistors $T_1$ and $T_2$ cease to conduct, and signal S switches to logic state "0" and remains in this state until the user of the coin telephone set hangs up the hand microphone, restoring both bistables KA and KB to their initial conditions.

If, when taking up the hand microphone the polarity of the line wires $a$ and $b$ is the contrary to that assumed above, the bistable element KB will switch first, then as the polarity reversal occurs the other bistable element KA is switched in turn, signal S being switched to "0" only when both KA and KB are switched. This advantageously results in that, when connecting the coin telephone set of the invention to the two wires $a$ and $b$ of the telephone line, it is not necessary to endeavor to identify the polarities of these two wires.

Figure 6:
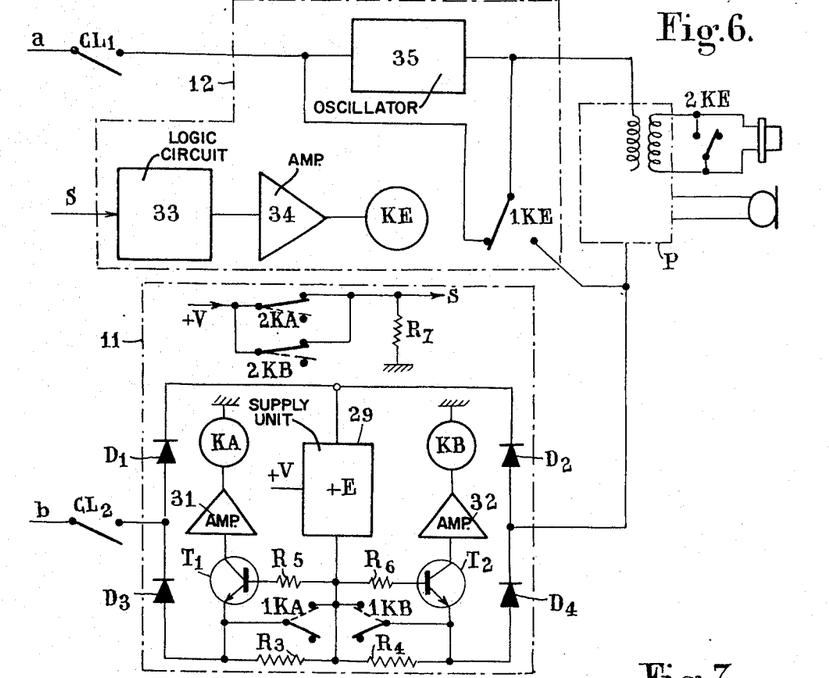
FIG. 6 illustrates partly in block diagram form and partly in wiring diagram form a warning device, and a device for detecting a reversal of the polarities of the two wires of the telephone line.

As also shown in FIG. 6, the signal S generated by detecting circuit 11 is fed to the warning circuit 12, more precisely to a logic circuit 33 controlling through a power amplifier 34 the energization of the coil of a relay of KE. This relay KE comprises a first contact 1KE which, when inoperative (i.e. in the position show in thick lines in FIG. 6), short-circuits an oscillator 35 operative to couple an audio warning signal to the telephone line and which, when actuated by the coil of relay KE, short-circuits the telephone station P while permitting the operation of oscillator 35. The above-mentioned relay KE further comprises a second contact 2KE which, when the relay coil is energized, short-circuits the earphone of the combined set of telephone station P.

Assuming that the telephone loop circuit associated with the telephone set of the invention has been established, and that the connection of said telephone set with the one of the desired telephone subscriber has not yet been made by the telephone exchange, i.e. the reversal of the polarities of wires $a$ and $b$ has not yet occured, the level of signal S is "1", since at least one of the contacts 2KA and 2KB is closed. Under these circumstances, the logic circuit 33 starts a momentary periodic energization of the coil of relay KE, so that the oscillator 35 is inserted in series into the telephone line and delivers an audible signal to the telephone exchange. This audible signal cannot be heard by the user of the coin telephone set since the earphone of the combined set and the telephone set itself are short-circuited, in order to reduce the possibilities of fraudulent use of the set by reproducing this signal. Therefore, a device capable of transmitting audible signals is obtained, which enables for example an operator at the telephone exchange to which the coin telephone set of this invention is connected, to locate a call from this set and to take due consideration thereof, for instance for controlling a reversal of the line wire polarities or for coupling one or more call charge pulses to the telephone line, or for receiving a phoned telegram. Then, when the polarities of wires $a$ and $b$ of the telephone line have been reversed, the level of signal S drops to value "0" so that the coil of relay KE is deenergized and the contacts of this relay resume their inoperative positions for short-circuiting the oscillator 35 and for re-introducing the telephone station P in series into the line.

Figure 7:
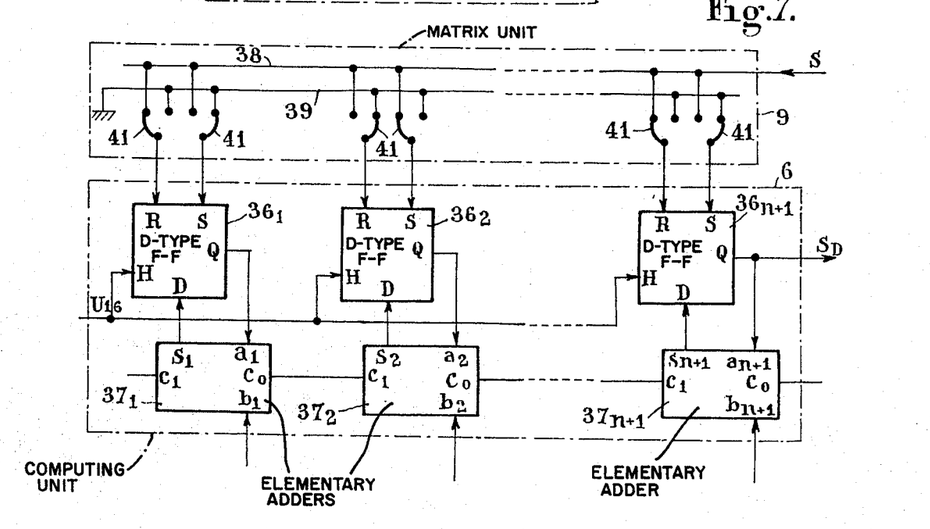
FIG. 7 is a block diagram of a computing unit according to the present invention.

Now reference will be made to FIG. 7 illustrating a typical embodiment of the computing unit 6 incorporated in the coin telephone set of the invention. As clearly shown in this Figure, the computing unit 6 comprises a series of D-type flip-flops $36_1$, $36_2$, ... $36_{n+1}$, and a series of elementary adders $37_1$, $37_2$, ... $37_{n+1}$. The D-type flip-flops may consist for instance of electronic components marketed under the trade mark MC 14013 by the Motorola Company. The elementary adders may consist for instance of electronic components marketed by the same Motorola Company under the trade mark MC 14008.

Referring again to FIG. 7, it will be seen that each elementary adder $37_i$ has its input $a_i$ connected to the output Q of the type-D flip-flop $36_i$, its carry input $c_1$ connected to the carry output $c_0$ of the next preceding elementary adder $37_{1-1}$ in the series, its carry output $c_0$ connected to the carry input $c_1$ of the next succeeding elementary adder $37_{i+1}$ in the series, its output $S_i$ connected to the input D of the D-type flip-flop $36_i$ having the same order number $i$ in the series. The inputs $b_1$, $b_2$, ... $b_{n+1}$ of adders $37_1$, $37_2$, ... $37_{n+1}$ are connected respectively to the outputs of gate circuit 7 (cf. FIGS. 1 and 2) designated by the same reference symbols. Moreover, all the inputs H of flip-flops $36_1$, $36_2$, ... $36_{n+1}$ are connected to the output $U_{16}$ of gate circuit 7. On the other hand, the debit signal $S_D$ mentioned in the foregoing is available at the output Q of flip-flop $36_{n+1}$.

Instead of initializing at "0" the contents of the various memory elements of computing unit 6 (i.e. the contents of flip-flops $36_1$, $36_2$, ... $36_{n+1}$) and charging the amount of the first call charge when the first call charge pulse is received, the content of the computing unit is initialized at a value corresponding to the amount of the first call charge and the first call charge pulse is not taken into account, means (not shown) being provided for eliminating said first call charge pulse. It is thus possible to give to said first call charge a value differing from or equal to, that of the following call charges or amounts to be paid in. In order to initialize the computing unit 6 a matrix 9 is provided for coding the value of the first call charge. This coding matrix 9 comprises a line 38 receiving the output signal S from detecting circuit 11 (this signal S serving here as an initializing signal) and a line 39 connected to the ground. Each one of the two inputs R and S of each D-type flip-flop $36_1$, $36_2$, ... $36_{n+1}$ may be connected as desired either to line 38 or to line 39 by means of strap-type connecting bars 41. Thus, it is possible to give any desired value to the first call charge by coding the same according to the above-described coding procedure.

Now the mode of operation of computing unit 6 will be described in detail. Firstly, it may be emphasized that, according to the specific code implemented, the addition or subtraction operations are reduced to a mere addition operation. Therefore, in the inoperative condition, i.e. before establishing the telephone connection (before reversing the polarities of wires $a$ and $b$ of the telephone line) the initializing signal S is in state "1", as well as signal $U_{16}$ fed to all the inputs H of flip-flops $36_1$, $36_2$, ... $36_{n+1}$, since this signal $U_{16}$ is equal to ($\Gamma + t_0$) and, in the inoperative condition, both $\Gamma$ and $t_0$ are in state "0". Thus, the computing unit 6 is blocked, its content is equal to the amount of the first call charge, and the debit signal $S_D$ is present at the output of the last flip-flop 36 of the series. Then, when the telephone connection is established through and by the telephone exchange and, consequently, the initializing signal S changes from state "1" to state "0", the logic circuit 4 (FIG. 4) controls in the manner already described in the foregoing the collection of the coins previously introduced into the slot of the telephone set by the user and held in suspension in coin sequestering means before being definitely collected. Let $p$ be the amount corresponding to the collected coin and $q$ the code corresponding to the amount $p$. The code $q$ appears on outputs $b_1$, $b_2$, ... $b_{n+1}$ of gate circuit 7 and each one of the bits of this code $q$ is temporarily coupled to the inputs of equal weight of elementary adders $37_1$, $37_2$, ... $37_{n+1}$. At the same time, a pulse $\Gamma$ of value "1" is generated. This pulse is converted by the NOR gate 16 into a pulse of value "0" which is fed to the inputs H of flip-flops 36. On the leading edge (descending wave front) of this "0" pulse, the content of the computing unit 6 which was aqual to the amount of the first call charge, is added to the number $q$ and, on the trailing edge (ascending wavefront) of this "0" pulse, the result of this operation is introduced into the flip-flops D $36_1$, $36_2$, ... $36_{n+1}$. If the value of the collected coin were less than the prescribed amount of the first call charge, the user's account would remain a debit account and the debit signal $S_D$ would still be present at the output of computing unit 6, whereby the logic circuit 4 can control the collection of another coin of which the value is brought immediately to the credit of the user's account in computing unit 6. Thus, the coins are collected one by one until the debit signal $S_D$ disappears; then, each time a call charge pulse (except the first one) occurs in the telephone line during the telephone conversation, this pulse is treated by the logic circuit 3 (FIG. 2) and its value is carried to the debit of the user's account in the computing unit, exactly in the same manner as if the user's account had been credited with the value of each collected coin, due to the identity of the code used for positive or negative informations. If, as a consequence of the registration of the call charge value in the computing unit, the user's account displays a debit balance, the signal $S_D$ appears again at the output of flip-flop $36_{n+1}$ and controls as in the preceding case the collection of coins, one by one, until the user's account shows again a credit balance. If the coin sequestering means of the telephone set is void of any coin, the signal $S_D$ may be used for delivering via a suitable logic circuit a signal for warning the user of the telephone set that he must introduce another coin or several coins if he wishes to continue his conversation with the other subscriber.

From the above description it is obvious that the coin telephone set according to the present invention is attended by many advantageous features. Thus, notably, this set is characterized by a low power consumption and, besides, its computing unit can be constructed at a relatively low cost. Moreover, due to the novel conception of this computing unit it is possible to give to the first call charge a value other than that of the following charges. In fact, the initializing of the computing unit is independent of the call charge signals and may consequently be adjusted or preset separately. The circuit for detecting the reversal of polarity of the two wires of the telephone line permits not only of coupling an initializing signal to the computing unit, but also of controlling the polarity reversal and therefore response of the subscriber called by the user of the coin telephone set. Moreover, when a polarity reversal occurs, the polarity reversal detecting circuit permits controlling immediately the collection of coins, since the user's account shows already a debit balance. The accounting of coins is limited to the last coin collected by the telephone set, and the coins not collected but held in the coin sequestering means of the telephone set are not accounted and kept in a waiting position before being either collected or refunded. Finally, this invention is applicable to both pre-payment telephone sets and postpayment telephone sets.

It will be readily understood by those conversant with the art that the specific form of embodiment of the invention which has been described hereinabove with reference to the attached drawings is given by way fo example only, since various modifications and changes may be brought thereto without departing from the scope of the invention as defined in the appended claims.

What is claimed as new is:

1. A coin telephone set comprising a telephone station adapted to be connected to two wires of a telephone line from a telephone exchange, a call charge signal detecting circuit connected in parallel to the telephone station, an assembly of control and monitoring switching means operable by coins, logic circuits for processing output signals from said call charge signal detecting circuit and output signals from the assembly of control and monitoring switching means, and a computing unit interconnected to the logic circuits for keeping current the account of the user of the telephone set from the moment the latter is connected to the desired telephone subscriber, said computing unit comprising a series of D-type flip-flops having each a clock input, a signal input, a resetting input, a setting input and an output, and a series of elementary adders equal in number to said D-type flip-flops, each adder being associated with a respective one of the D-type flip-flops having the same order number in the series, and having a first input connected to the output of the associated D-type flip-flop of the series, a second input for receiving from the logic circuits a respective one of the bits of a code $q$ of an information $p$ ($p$ being a positive, negative or zero integer representing an amount of money to be carried to the credit or debit of the user's account), said respective one bit having a weight $i$ ($i = 1, 2, \ldots n+1$) equal to the order number of the considered elementary adder, and said code $q$ being defined as follows:

$q = C_p$ when $p \geq 0$
$q = C_n - C_p$ when $p < 0$ wherein $n$ is a minimum interger such that:

$$2^n - 1 \geq p \geq -2^n$$

and wherein $C_n$ and $C_p$ are the pure binary coded expressions of $2^{n+2}$ and of the absolute value of the information $p$ on ($n + 1$) digits, each elementary adder further comprising a carry input for receiving a carry output signal from the next precedingelementary adder in the series, a carry output connected to the carry input of the next succeeding elementary adder in the series, and an output connected to the signal input of the associated D-type flip-flop for applying thereto a signal representing the sum of the signals applied to the first, second and carry inputs of the considered elementary adder.

2. A coin telephone set according to claim 1, further comprising a matrix adapted to code the value of the first call charge to be accounted, said matrix having outputs connected to the resetting and setting inputs of the D-type flip-flops and an input receiving an initializing signal.

3. A coin telephone set according to claim 1, wherein said logic circuit for processing the output signal of the call charge signal detecting circuit comprises a storage device synchronized with a first clock pulse signal, said storage device having an input connected to an output of the call charge signal detecting circuit and an output connected to respective inputs of a first pulse selecting circuit and of a first coding circuit operative to code the call charge signal according to said code, said coding circuit having outputs connected in parallel through respective OR gates to said second inputs, respectively, of the elementary adders of said computing unit.

4. A coin telephone set according to claim 3, wherein the first pulse selecting circuit has another input to which is a second clock pulse signal comprising pulses having the same frequency as and interleaved between the pulses of the first clock pulse signal, said first selecting circuit being operative to deliver at an output thereof only the first pulse of the second clock pulse signal which follows the beginning of the call charge signal stored in the storage device, the output of said first pulse selecting circuit being connected to a first input of a NOR gate having an output connected to the clock inputs of the D-type flip-flops of the computing unit and to a general unlocking input of the first coding circuit.

5. A coin telephone set according to claim 4, further comprising coin sequestering means for momentarily retaining coins introduced by the user in the coin telephone set, and wherein said assembly of switching means comprises a series of control switches equal in number to the number necessary for detecting the prepayment of the first call charge by the user of all the possible combinations of coins introduced into the coin sequestering means of the coin telephone set and for detecting the presence of each type of coin in the coin sequestrating means, and a monitoring switch operable, during collection of one of the coins introduced into the coin sequestrating means, by the coin being collected for producing an enabling signal.

6. A coin telephone set according to claim 5, wherein said control and monitoring switches comprise mechanical switches, each mechanical switch being connected to couple, when actuated by a coin, a signal having a binary value "1" at an associated output of the assembly of switching means, respectively.

7. A coin telephone set according to claim 6, further comprising a coin collecting logic control circuit operative to control the collection of coins introduced into the telephone set by the user, one by one and in a predetermined order, the accounting of said coins in the computing unit being limited to the last coin collected in synchronism with a selected pulse of the second clock pulse signal and on receipt of a debit signal available from the output of the last D-type flip-flop of the series, and wherein the outputs associated with the switches of the assembly of switching means are coupled to respective inputs of said logic control circuit.

8. A coin telephone set according to claim 7, further comprising a logic circuit connected to the monitoring switch for processing the enabling signal therefrom, said logic circuit comprising a second storage device for storing the enabling signal from the monitoring switch and synchronized with the second clock pulse signal, a circuit having one input connected to an output of said second storage device and a second input receiving the first clock pulse signal, said circuit comprising a second pulse selecting circuit operative to deliver at an output thereof only the first pulse of the first clock pulse signal which follows immediately the beginning of the enabling signal stored in said second storage device, and a circuit for generating a signal indicating the end of a cycle of registration in the computing unit, the output of said second pulse selecting circuit being connected to a second input of said NOR gate having the output thereof connected to the clock inputs of said D-type flip-flops.

9. A coin telephone set according to claim 8, wherein the coin collecting logic control circuit comprises a plurality of outputs in number to the types of coins insertable into the telephone set, and wherein said enabling signal processing logic circuit further comprises a plurality of AND gates equal in number to the outputs of said coin collecting logic control circuit, each AND gate having a first input connected to a respective output of said coin collecting logic control circuit and a second input connected to the output of the second pulse selecting circuit, and a second coding circuit having inputs connected to respective outputs of said AND gates and operative to code the signals from said AND gates in accordance with said code, said second coding circuit having outputs connected respectively to other inputs of said OR gates having their outputs connected to the second inputs of said elementary adders, respectively.

10. A coin telephone set according to claim 2, further comprising means for detecting a reversal of the polarities of the two wires of the telephone line and for generating said initializing signal in response to the detection of such a reversal.

11. A coin telephone set according to claim 10, wherein said wire polarity, reversal detecting means comprises a diode bridge having two diagonals, one diagonal being connected to the telphone line, and a pair, of symetrically connected transistors having the bases thereof connected to the other diagonal of said diode bridge, whereby a first one of said transistors is conducting when current flows through the diode bridge in a first direction, and the second transistor is conducting when the current flows through said diode bridge in the opposite direction, and two bistable means controlled each by a respective one of said pair of transistors, said bistable means having two switching means mounted in parallel and connected on the one hand to a source of d.c, voltage and on the other hand to an output terminal for taking out said initializing signal.

12. A coin telephone set according to claim 11, further comprising a logic control circuit responsive to said initializing signal, and an oscillator for coupling an audible warning signal to the telephone line and controlled by said logic control circuit, said logic control circuit comprising switching means operative to short-circuit the telephone station in the presence of said initializing signal and to short-circuit said oscillator in the absence of said initializing signal while allowing the operation of the telephone station.

* * * * *